US009043875B2

(12) United States Patent
Mahanfar et al.

(10) Patent No.: US 9,043,875 B2
(45) Date of Patent: May 26, 2015

(54) CONTACTLESS AUTHENTICATION OF OPTICAL DISK DRIVES

(71) Applicant: Microsoft Corporation, Redmond, WA (US)

(72) Inventors: Alireza Mahanfar, Bellevue, WA (US); Benjamin Shewan, Redmond, WA (US); Remy Carole, Seattle, WA (US); Mark Casebolt, Seattle, WA (US); Tse-Ching Yu, Woodinville, WA (US); Jeffrey Griffis, San Carlos, CA (US); Javier Rodriguez De Luis, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 102 days.

(21) Appl. No.: 13/782,330

(22) Filed: Mar. 1, 2013

(65) Prior Publication Data

US 2014/0250495 A1  Sep. 4, 2014

(51) Int. Cl.
| | |
|---|---|
| G06F 12/14 | (2006.01) |
| G06F 21/30 | (2013.01) |
| H04L 29/06 | (2006.01) |
| G11B 20/00 | (2006.01) |
| G11B 23/04 | (2006.01) |
| G11B 23/28 | (2006.01) |

(52) U.S. Cl.
CPC ............... *G06F 21/30* (2013.01); *H04L 63/10* (2013.01); *G11B 20/00876* (2013.01); *G11B 23/042* (2013.01); *G11B 23/284* (2013.01)

(58) Field of Classification Search
None
See application file for complete search history.

(56) References Cited

U.S. PATENT DOCUMENTS

| | | | |
|---|---|---|---|
| 7,031,470 B1 * | 4/2006 | Bar-On | ........................ 380/203 |
| 7,102,519 B2 | 9/2006 | Lyon et al. | |
| 7,275,040 B2 | 9/2007 | Forster et al. | |
| 7,292,147 B2 | 11/2007 | Benedikt | |

(Continued)

FOREIGN PATENT DOCUMENTS

| | | |
|---|---|---|
| EP | 0996124 A1 | 4/2000 |
| EP | 1553576 A1 | 7/2005 |
| WO | 2004/006257 A1 | 1/2004 |
| WO | 2007/042733 A1 | 4/2007 |

OTHER PUBLICATIONS

"International Search Report & Written Opinion for PCT Application No. PCT/US2014/018411", Mailed Date: Jun. 27, 2014, Filed Date: Feb. 25, 2014, 10 pages.

(Continued)

*Primary Examiner* — Brandon Hoffman
(74) *Attorney, Agent, or Firm* — Brandon Roper; Judy Yee; Micky Minhas

(57) ABSTRACT

An optical disc drive (ODD) includes a radio-frequency identification (RFID) reader. The reader includes a circuit and a coil antenna which has a rotational symmetry with respect to a rotation axis of a motor, shaft and turntable of the ODD. The coil antenna can be secured to a wall of a housing of the ODD or around the motor and/or shaft. The reader can read an RFID tag on an optical disc. The RFID tag includes a circuit and a coil antenna which has a rotational symmetry with respect to the disc. As a result, the RFID tag can be read while the disc is rotating. A magnetic insulating material such as a ferrite polymer composite film is used to magnetically insulate the coil antenna. An authentication code can be read from the RFID tag to control access to content of the optical disc.

20 Claims, 9 Drawing Sheets

(56) References Cited

U.S. PATENT DOCUMENTS

| | | | |
|---|---|---|---|
| 7,292,512 B2 | 11/2007 | Ryal | |
| 7,317,396 B2 | 1/2008 | Ujino | |
| 7,378,971 B2 | 5/2008 | Andrechak et al. | |
| 7,447,143 B2 | 11/2008 | Forster et al. | |
| 7,789,314 B2 | 9/2010 | Karstens | |
| 7,869,338 B2 | 1/2011 | Miyashita et al. | |
| 7,978,567 B2 | 7/2011 | Ashizaki et al. | |
| 8,214,651 B2 | 7/2012 | Anemikos et al. | |
| 2007/0002707 A1* | 1/2007 | Kwong et al. | 369/52.1 |
| 2007/0094862 A1 | 5/2007 | Posamentier | |
| 2010/0045438 A1* | 2/2010 | Pintos et al. | 340/10.1 |
| 2010/0276193 A1 | 11/2010 | Liu | |

OTHER PUBLICATIONS

Burlington, Ontario, "U-Tech, RiRF and IPICO to Eliminate Optical Disc Piracy in Entertainment and IT Sectors with New Embedded RFID Chip-On-Disc Technology", Retrieved on: Oct. 22, 2012, Available at: http://money.cnn.com/news/newsfeeds/articles/marketwire/06163161.htm.

Morshed, et al., "Secure Ubiquitous Authentication Protocols for RFID Systems", In Proceedings of EURASIP Journal on Wireless Communications and Networking, Mar. 8, 2012, 13 pages.

"RFID Chip-on-disc Aims to Kill Off DVD Piracy", Published on: Sep. 25, 2006, Available at: http://www.usingrfid.com/news/read.asp?Ic=p45520mx845zm.

Ch. 16: Linear and Loop Antennas, [www.ece.rutgers.edu/~orfanidi/ewa/ch16.pdf], Aug. 2010, 12 pages.

PCT Demand and Amendments under Article 34 dated Oct. 2, 2014, International Application No. PCT/US2014/018411.

Written Opinion of the International Preliminary Examining Priority dated Mar. 31, 2015, International Application No. PCT/US2014/018411.

\* cited by examiner

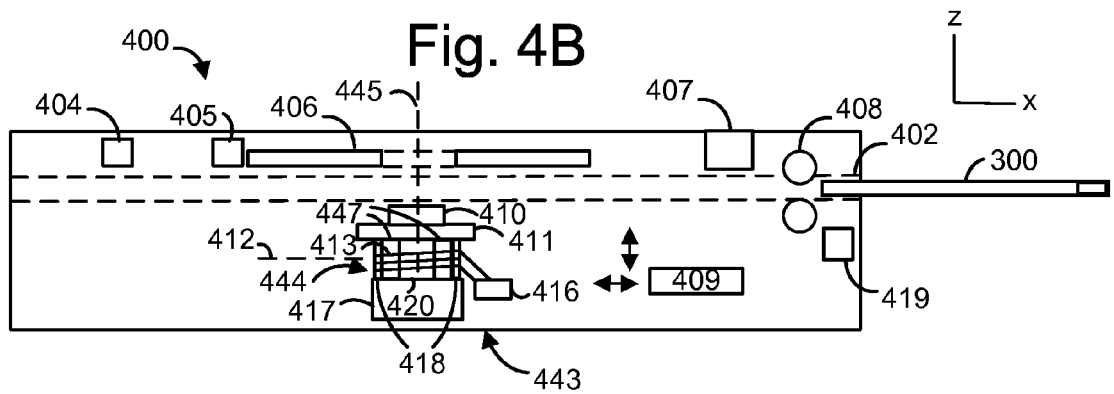
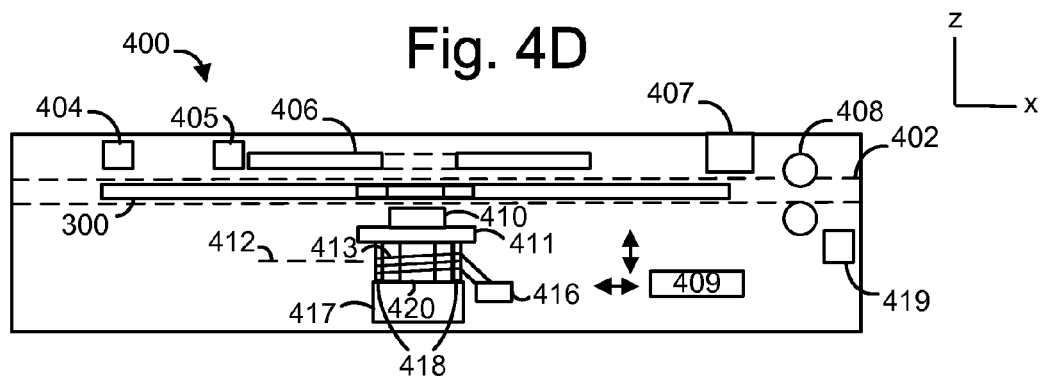
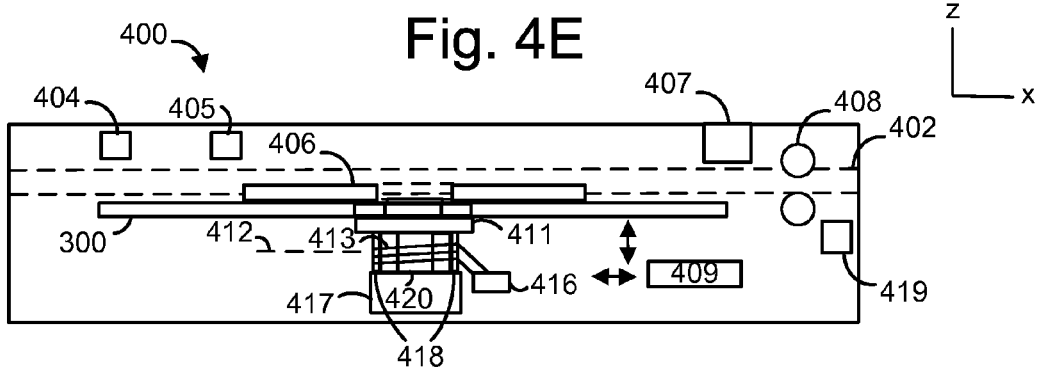

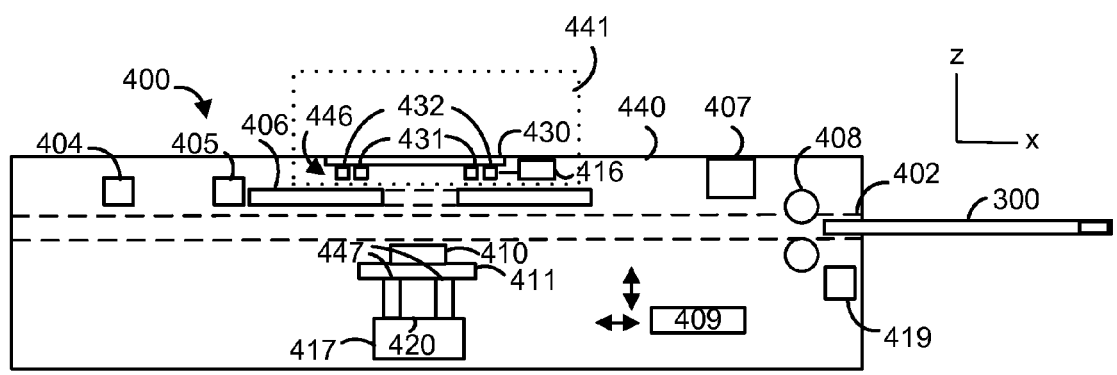
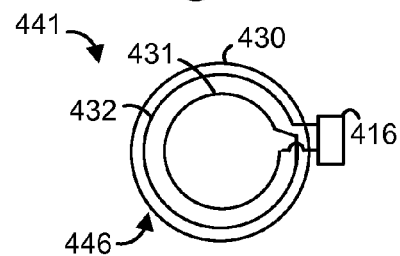

CONTACTLESS AUTHENTICATION OF OPTICAL DISK DRIVES

BACKGROUND

Optical discs are a common type of portable media used in computing systems such as personal computers, laptops and multimedia/game consoles. Different types of data can be stored in a digital format on such discs. For example, the compact disc (CD), digital video/versatile disc (DVD) and Blu-ray® disc (BD) are in common use. The CD has been used for storing audio recordings as well as other data. The DVD has been used for storing larger amounts of data, including broadcast-quality digital video. The BD can store even more data such a high-definition video. Optical discs are widely distributed due to their portability but this can conflict with the desire to control access to the content of the disc.

SUMMARY

As described herein, techniques are provided for controlling access to an optical disc when the optical disc is loaded into an optical disc drive (ODD). The disc is configured with an RFID tag while the ODD is provided with a corresponding reader such as above the disc on a housing surface or below the disc around a motor. When the disc is inserted, the reader reads the tag to recover authentication data. Based on the authentication data, a decision is made as to whether to allow access to content on the disc.

In one approach, an optical disc drive includes a turntable adapted to seat an optical disc, a shaft which connects the turntable to a motor, an RFID reader circuit adapted to read data from an RFID tag on the optical disc, and a processor in communication with the RFID reader circuit. The processor receives the data from the RFID reader circuit and determines whether to allow access to the optical disc, e.g., to optically encoded data in a metallized data-carrying region of the disc. The RFID reader and the RFID tag can both include a coil antenna which has a rotational symmetry with respect to an axis of the shaft so that the RFID tag can be read while the disc is rotating. The coil antenna of the RFID reader can be attached to a housing of the ODD or to a cover of the motor/shaft, for instance. The coil antenna of the RFID tag can extend in a hub region of the disc which does not include optically encoded data.

This summary is provided to introduce a selection of concepts in a simplified form that are further described below in the description. This summary is not intended to identify key features or essential features of the claimed subject matter, nor is it intended to be used to limit the scope of the claimed subject matter.

BRIEF DESCRIPTION OF THE DRAWINGS

In the drawings, like-numbered elements correspond to one another.

FIG. 4B depicts a representation of a cross sectional view of the disc drive 400 of FIG. 4A along the dashed line 403, where coils 413 of a coil antenna 444 of an RFID reader 443 are wrapped around a motor/shaft of the ODD.

FIG. 4C depicts a cross-sectional view of a portion of the motor/shaft of FIG. 4B along the dashed line 412.

FIG. 4D depicts a representation of a cross sectional view of the disc drive 400 of FIG. 4A along the dashed line 403, where the disc 300 is at the end of the loading path in a position which is sensed by a sensor 404.

FIG. 4E depicts a representation of a cross sectional view of the disc drive 400 of FIG. 4A along the dashed line 403, where the disc 300 is clamped to a turntable 411.

FIG. 4F depicts a representation of a cross sectional view of the disc drive 400 of FIG. 4A along the dashed line 403, where a coil antenna of an RFID reader 441 is secured to a top wall 440 of the housing of the ODD via a magnetic insulation material 430.

FIG. 4G depicts a frontal view of the RFID reader 441 of FIG. 4F.

DETAILED DESCRIPTION

Figure 1:
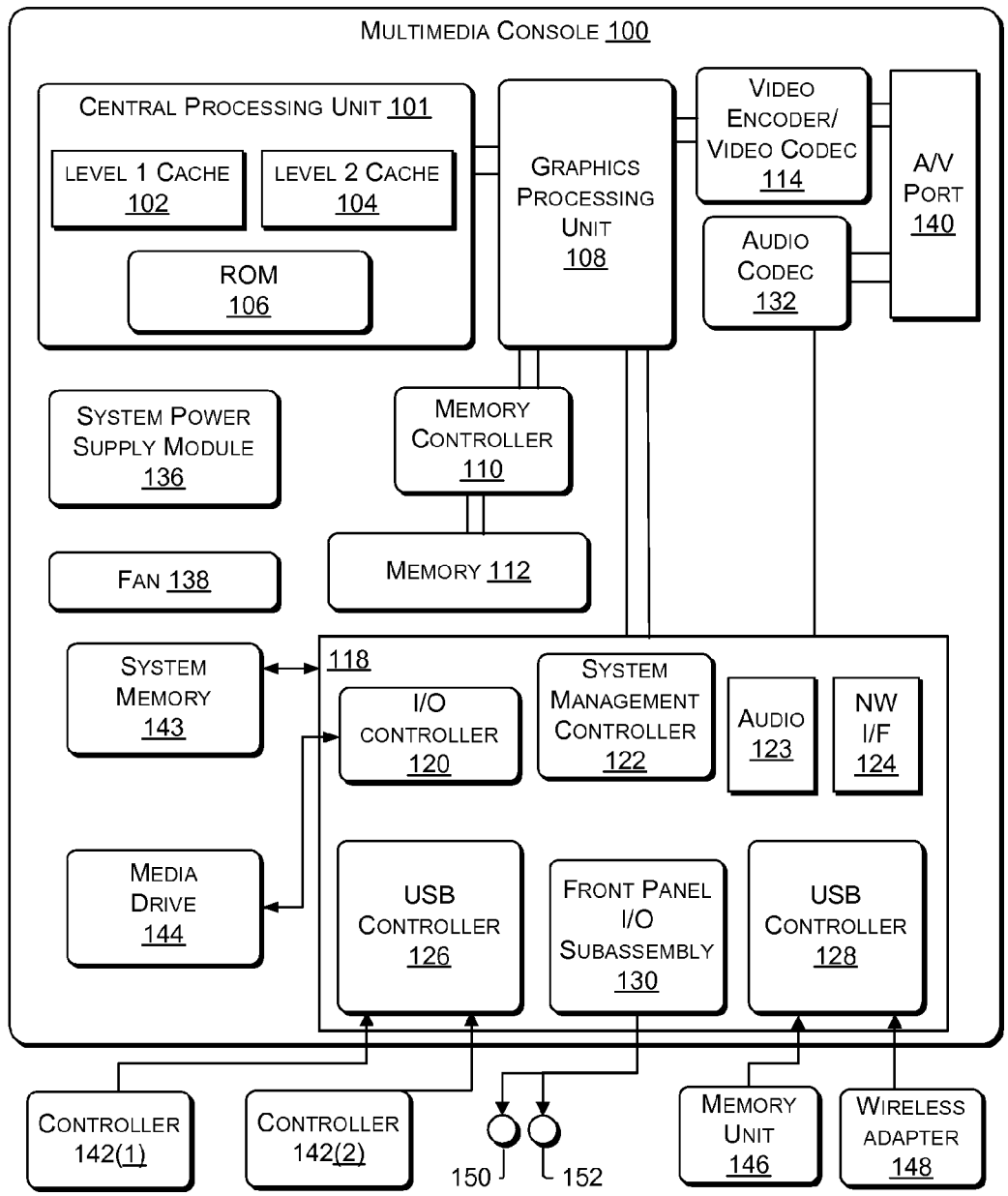
FIG. 1 depicts an example block diagram of a multimedia console which uses a media drive 144 such as an optical disc drive.

As mentioned at the outset, optical discs are commonly used by computing systems such as personal computers, laptops and multimedia/game consoles. An optical disc is accessed by an optical disc drive (ODD) which may be built in to, or attached as a peripheral to, a host computing device. The host computing device includes applications which can access the optical disc such as to read data from it. Moreover, in many situations it is desirable to control access to the content, e.g., audio, video or other data, on an optical disc. For example, the owner of the content may choose to limit access to the disc to users who pay a fee. Software solutions have been developed to protect content on optical discs, but they have proven to be inadequate since the problem of piracy still persists.

One possible solution for preventing piracy is to deploy radio-frequency identification (RFID) technology to authenticate the contents of an optical disc. This approach can involve transferring an authentication code via magnetic coupling between a base radio (e.g., an RFID reader) and pre-coded circuitry (e.g., an RFID tag) that is located on the media. The tag can be coded with the authentication code, e.g., a value which is recognized to allow access to the disc. Moreover, the magnetic coupling is achieved by using coil antennas.

A number of challenges are encountered in using RFID technology in an ODD. First, the environment is dynamic since the optical disc rotates at high speed, potentially causing high frequency interference to electromagnetic fields. Second, electromagnetic fields generated by the reader can couple to metallic surfaces in the motor at the center of the optical disc drive as well as to other metal components such as the housing. Moreover, the proximity of metal adversely affects the efficiency of magnetic coupling between the tag and the reader. Third, the available locations to place an RFID tag on an optical disc are limited. The surface area of the optical disc is exposed to be optically visible to an optical pick up unit. Also, the thickness of the optical disc is limited. Fourth, adapting the impedance at the reader coil input and the radio (reader circuit) is a challenge. Given the complex surroundings of the reader coil, which can be mostly metallic, and the rotation of the tag, there is lower mismatch loss tolerance. It is desirable to minimize the sensitivity of the impedance matching to coil impedance variations.

The techniques provided herein address the above challenges and provide a number of features and benefits. In one aspect, an RFID tag is provided in a non-metalized, inner hub region of the disc. In another aspect, RFID technology is used for authentication of the media in an optical disc. A possible optimal location for the reader coil antenna is around the motor of the ODD. Another possible optimal location for the reader coil antenna is on a top surface of the ODD housing, such as on a lid, if present. A possible optimal location for the tag coil antenna is around the central hub region of the media. In another aspect, a ferrite absorber (such as a ferrite polymer composite film or sheet) is used to magnetically isolate the reader coil from the metallic surroundings. Moreover, the reader coil and the tag coil may have rotational symmetry with respect to a rotation axis of a motor of the ODD (which is the rotation axis of the optical disc as well).

FIG. 1 depicts an example block diagram of a multimedia console which uses a media drive 144 such as an optical disc drive. The computing system may include a multimedia console 100, such as a gaming console. The multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The memory 106 such as flash ROM may store executable code that is loaded during an initial phase of a boot process when the multimedia console 100 is powered on.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as RAM (Random Access Memory).

The multimedia console 100 includes an I/O controller 120, a system management controller 122, an audio processing unit 123, a network interface 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface (NW IF) 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise an optical disc drive. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection.

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures.

When the multimedia console 100 is powered on, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be loaded or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered on, a specified amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application uses audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches.

Figure 2:
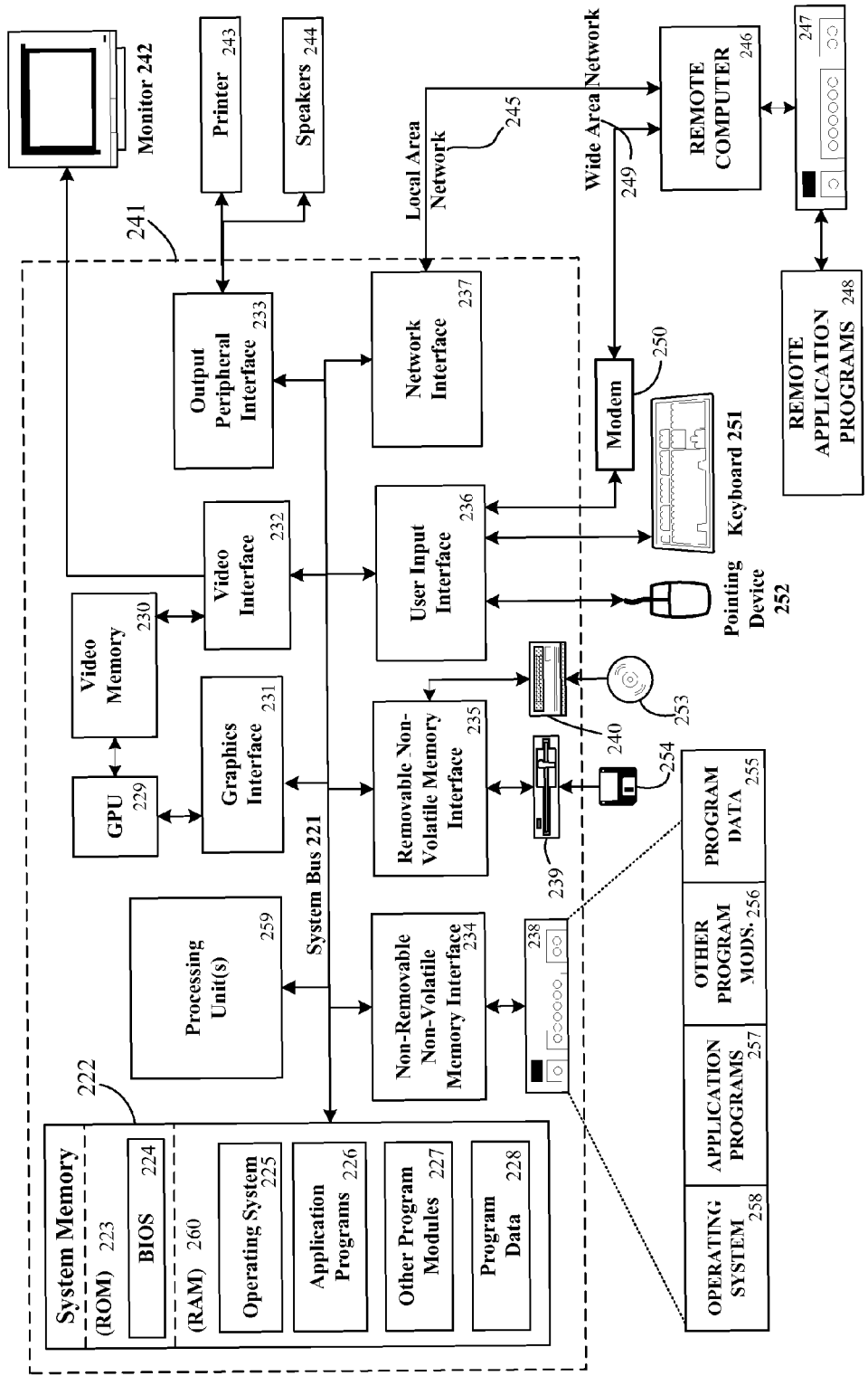
FIG. 2 depicts another example block diagram of a computing system which uses a disc drive.

FIG. 2 depicts another example block diagram of a computing system which uses an optical disc drive 240. The computing system 200 comprises a computer 241, which typically includes a variety of tangible computer-readable storage media. This can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. A graphics interface 231 communicates with a GPU 229. By way of example, and not limitation, operating system 225, application programs 226, other program modules 227, and program data 228 are provided.

The computer 241 may also include other removable/non-removable, volatile/nonvolatile computer storage media, e.g., a hard disk drive 238 that reads from or writes to non-removable, nonvolatile magnetic media, a magnetic disk drive 239 that reads from or writes to a removable, nonvolatile magnetic disk 254, and an optical disc drive 240 that reads from or writes to a removable, nonvolatile optical disc 253. Other removable/non-removable, volatile/nonvolatile tangible computer-readable storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through a non-removable memory interface such as interface 234, and magnetic disk drive 239 and optical disc drive 240 are typically connected to the system bus 221 by a removable memory interface, such as interface 235.

The drives and their associated computer storage media provide storage of computer-readable instructions, data structures, program modules and other data for the computer 241. For example, hard disk drive 238 is depicted as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to depict that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). A monitor 242 or other type of display is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been depicted. The logical connections include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, remote application programs 248 reside on memory device 247. It will be appreciated that the network connections shown are exemplary and other means of establishing a communications link between the computers may be used.

The computing system can include a tangible computer-readable storage device or apparatus having computer-readable software embodied thereon for programming at least one processor to perform methods as described herein. The tangible computer-readable storage device can include, e.g., one or more of components 222, 234, 235, 230, 253 and 254. Further, one or more processors of the computing system can provide processor-implemented methods as described herein. The GPU 229 and the processing unit 259 are examples of processors.

Figure 3A:
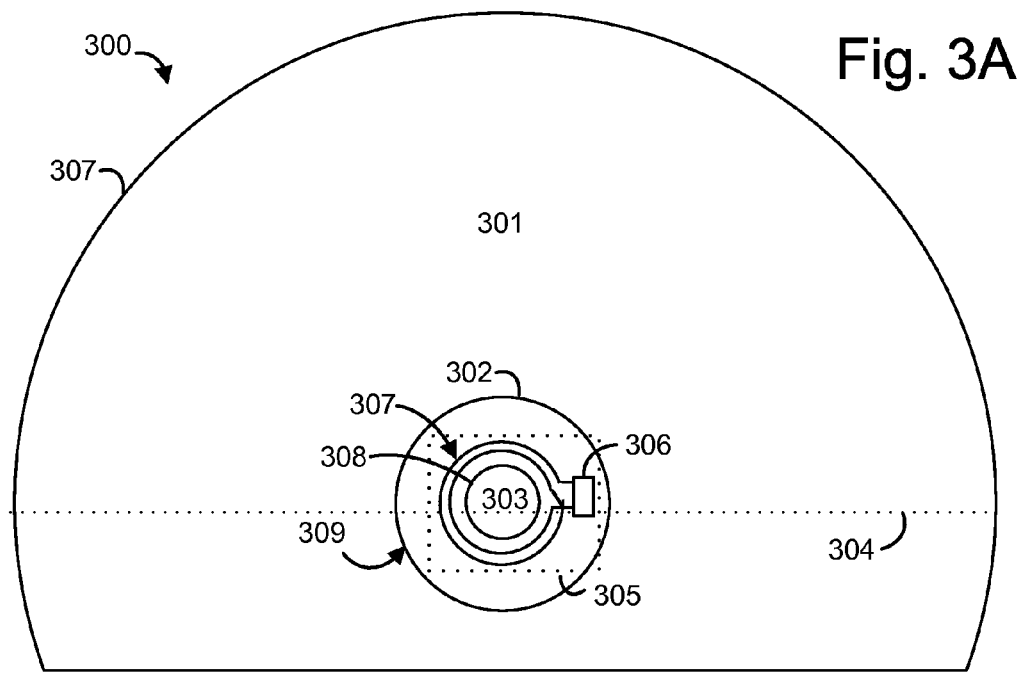
FIG. 3A depicts an example of an optical disc 300 having a data-carrying region 301, a hub region 309 which carries an RFID tag 305 but does not carry data and a central aperture 303.

FIG. 3A depicts an example of an optical disc 300 having a metallized data-carrying region 301, a hub region 309 which carries an RFID tag 305 but does not carry optically-encoded data and a central aperture 303. Each family of optical discs is associated with a variety of standards relating to the physical and logical format of the discs and their operating conditions. For example, the laser wavelength and the numerical aperture (NA) of the objective lens with which the disc can be read and/or written to are specified, as well as the tracking method associated with the disc type. For example, the NA of the lens for CD, DVD or BD is 0.45-0.52, 0.60 or 0.85, respectively. For a CD, an infrared laser with a wavelength of 780 nm may be used. For a DVD, a red laser with a wavelength of 650 nm may be used. For a BD, a blue/violet laser with a wavelength of 405 nm may be used. For an ODD which accommodates CDs and DVDs, a twin laser pickup may be used in which two laser units share one objective lens. When BDs are also accommodated, a third laser unit may be used such as in a second optical pick up unit. Moreover, different types of optical discs have a different thickness of a protective layer or substrate which is between the data-carrying layer of the disc and the cover of the disc which faces the optical pick up unit of the ODD. These thicknesses are 1.2 mm, 0.6 mm and 0.1 mm for the CD, DVD and BD, respectively.

Figure 3B:
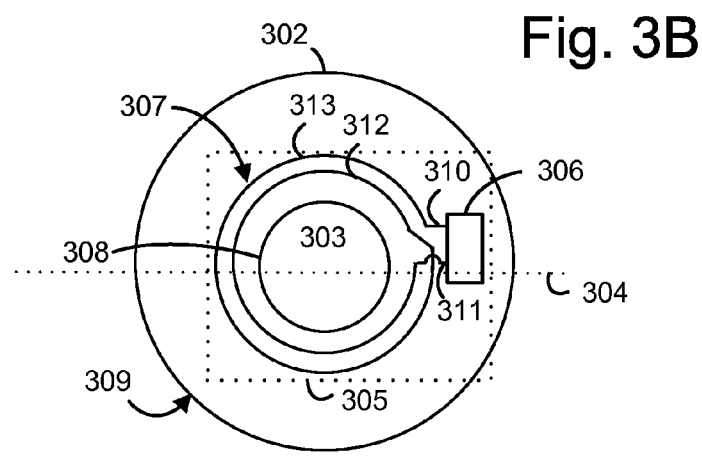
FIG. 3B depicts a close up view of the hub region 309 of the optical disc 300 of FIG. 3A, showing an RFID tag 305.

FIG. 3B depicts a close up view of the hub region 309 of the optical disc 300 of FIG. 3A, showing an RFID tag 305. The hub region extends between an outer periphery 302 and an inner periphery 308 which defines the central aperture 303. The RFID tag 305 includes a circuit 306 (e.g., an integrated circuit or chip) and a coil antenna 307. In this example, two turns 312 and 313 of the coil antenna 307 are provided. In practice, any number of turns may be used.

The antenna includes end points or ports 310 and 311 which are connected to the circuit 306. The circuit may be of a type which has no battery but is powered and read at short ranges via magnetic fields (e.g., using electromagnetic induction). Alternatively, the circuit may be of a type which has a local power source and emits radio waves (e.g., using electromagnetic radiation at radio frequencies). The circuit contains electronically stored data which is transferred to a reader. In one possible implementation, the data comprises an authentication code (e.g., one or more bytes of data) which is used to allow access to the optically encoded, data-carrying portion of the disc. Various other configurations of RFID systems may be used.

Generally, an RFID tag can include an integrated circuit for storing and processing information, modulating and demodulating a radio-frequency (RF) signal, and collecting DC power from an incident reader signal, and an antenna for receiving the reader signal and transmitting its response signal to the reader. The authentication code or other data can be stored in a non-volatile memory of the tag. The RFID tag thus includes an RF transmitter and receiver. An RFID reader transmits an encoded radio signal to interrogate the tag. The tag receives the message and responds with a signal comprising the stored data.

An RFID reader circuit similarly includes an integrated circuit (with an RF transmitter and receiver) and an antenna. RFID systems can have different configurations. A Passive Reader Active Tag system has a passive reader which receives radio signals from active tags (battery operated, transmit only). An Active Reader Passive Tag system has an active reader which transmits interrogator signals and also receives authentication replies from passive tags. In an Active Reader Active Tag system, active tags are awoken with an interrogator signal from the active reader. A variation of this system uses a Battery Assisted Passive tag which acts like a passive tag but has a small battery to power the tag's return reporting signal.

Thus, RFID tags can be either passive, active or battery assisted passive. An active tag has an on-board battery and periodically transmits a signal. A battery assisted passive has a small battery on board and is activated when in the presence of a RFID reader. A passive tag is cheaper and smaller because it has no battery. Instead, the tag uses the radio energy transmitted by the reader as its energy source. The interrogator is close so the RF field is strong enough to transfer sufficient power to the tag.

Tags may either be read-only, having a factory-assigned value, or read/write, where object-specific data can be written into the tag by the system user. Field programmable tags may be write-once, read-multiple. Blank tags may be written by the user.

One form of RFID technology is near-field communication (NFC) which allows two-way communication between the reader and the tag.

Figure 3C:
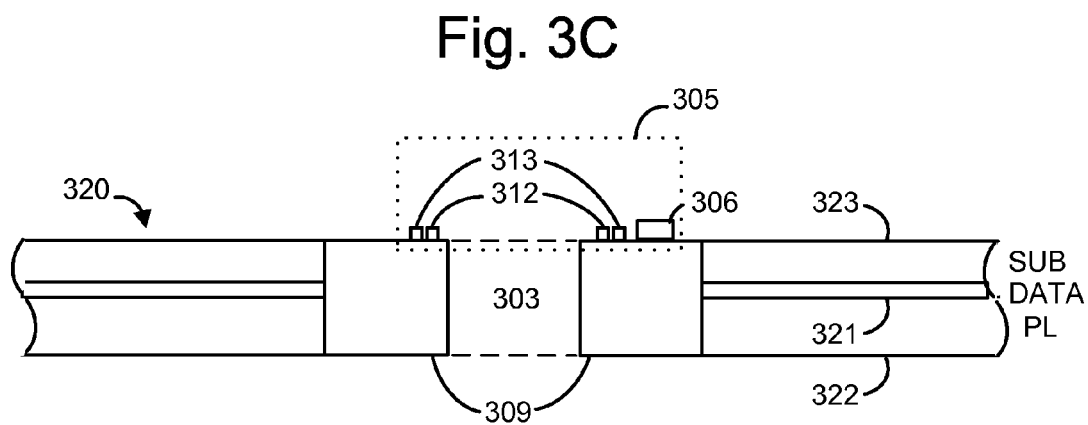
FIG. 3C depicts an optical disc 320 which is consistent with a cross-sectional view of the optical disc 300 of FIG. 3A along the dashed line 304, where the RFID tag 305 is on a surface 323 of the disc.

FIG. 3C depicts an optical disc 320 which is consistent with a cross-sectional view of the optical disc 300 of FIG. 3A along the dashed line 304, where the RFID tag 305 is on a surface 323 of the disc. The disc includes a substrate layer SUB, data-carrying layer DATA with a surface 321, protective layer PL with a surface 322, the inner hub region 309 and the central aperture 303. The substrates and protective layer can be a material such as polycarbonate. Also shown are the RFID tag circuit 306 and the turns 312 and 313 of the coil antenna 307 attached to the surface 323. The surface can be the top surface of the disc, for instance, opposite the surface which is read by the optical pickup unit. The RFID tag circuit 306 and the coil antenna 307 can be attached directly to the surface 323, e.g., using an adhesive. In one approach, the coil antenna comprises conductive ink which is printed on the surface of the optical disc.

Figure 3D:
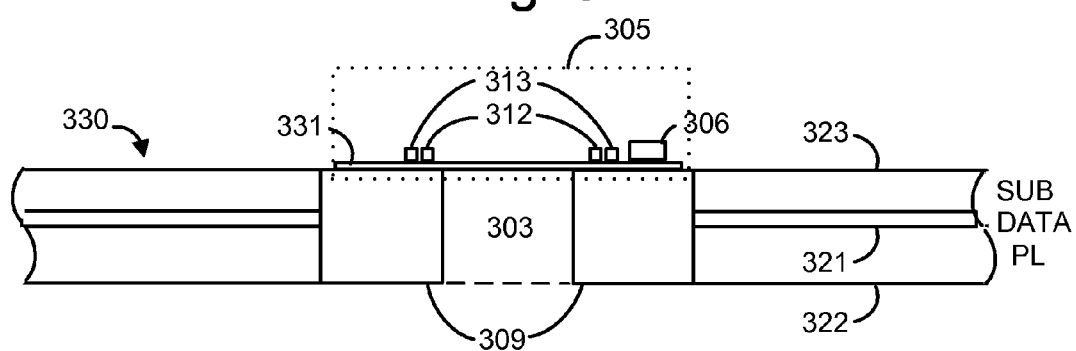
FIG. 3D depicts an optical disc 330 which is consistent with a cross-sectional view of the optical disc 300 of FIG. 3A along the dashed line 304, where the RFID tag 305 is on a substrate 331 attached to the surface 323 of the disc.

FIG. 3D depicts an optical disc 330 which is consistent with a cross-sectional view of the optical disc 300 of FIG. 3A along the dashed line 304, where the RFID tag 305 is on a substrate 331 attached to the surface 323 of the disc. The RFID tag circuit 306 and the coil antenna 307 can be attached to the substrate 331 using similar techniques as described in connection with FIG. 3C. Moreover, the RFID tag circuit 306 and the coil antenna 307 can be attached to the substrate 331 before the substrate is attached to the surface 323 of the disc. For example, the substrate can be a flexible printed circuit board which is attached to a surface of the optical disc. The coil antenna of the RFID tag can also be printed on a substrate which is attached to a surface of the optical disc.

Figure 3E:
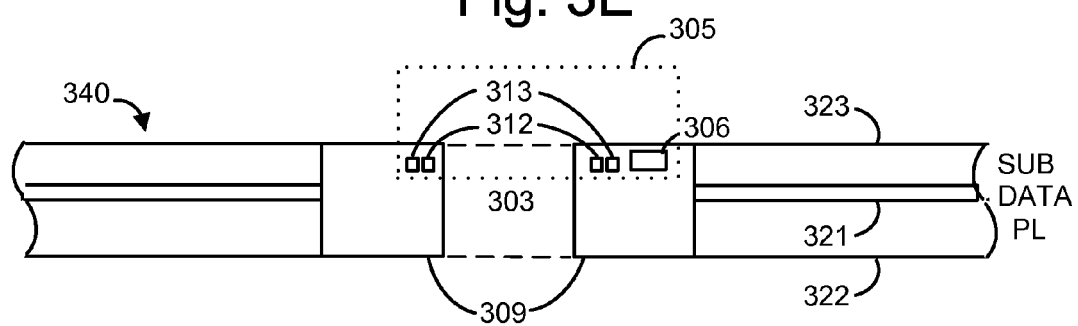
FIG. 3E depicts an optical disc 340 which is consistent with a cross-sectional view of the optical disc 300 of FIG. 3A along the dashed line 304, where the RFID tag 305 is embedded in the hub region 309 of the disc.

FIG. 3E depicts an optical disc 340 which is consistent with a cross-sectional view of the optical disc 300 of FIG. 3A along the dashed line 304, where the RFID tag 305 is embedded in the hub region 309 of the disc. The hub region could comprise a material such as polycarbonate, where the RFID tag 305 is embedded in the polycarbonate during the fabrication of the optical disc.

Figure 4A:
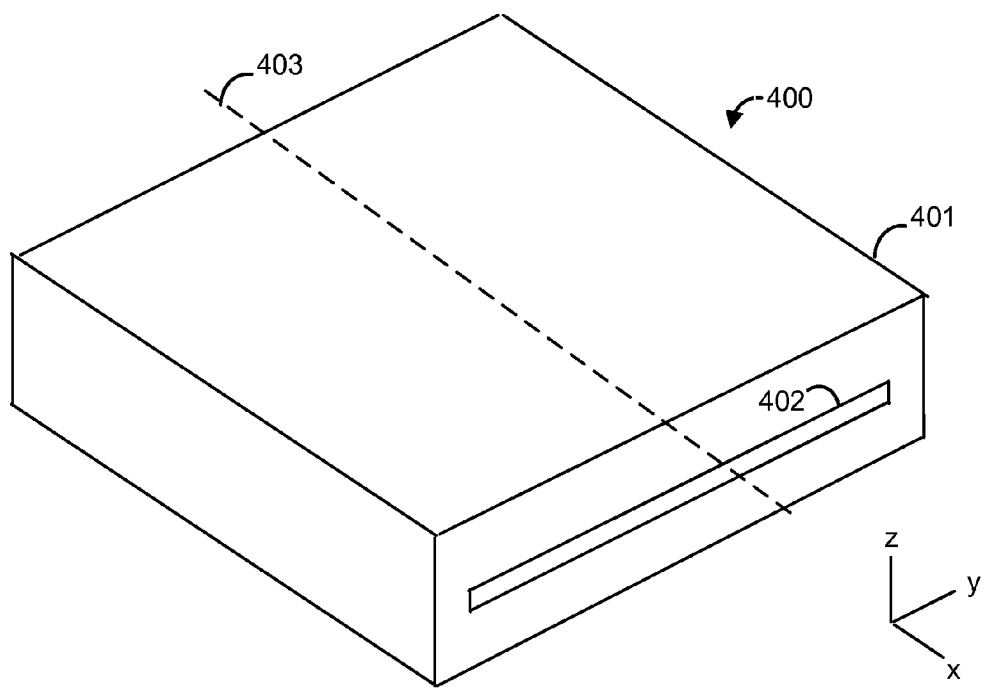
FIG. 4A depicts a perspective view of a disc drive 400 which includes a housing 401 and a loading path 402.

FIG. 4A depicts a perspective view of a disc drive 400 which includes a housing 401 and a loading path 402 such as a slot in which a user inserts the disc. Cross-sectional views along the dashed line 403 are depicted in FIGS. 4B, 4D, 4E and 4F. The disc drive can be integrated within a computing device or connected as a peripheral. An x-y-z coordinate system is also depicted.

FIG. 4B depicts a representation of a cross sectional view of the disc drive 400 of FIG. 4A along the dashed line 403, where coils 413 of a coil antenna 444 of an RFID reader 443 are wrapped around a motor/shaft of the ODD. Optical drives can use a tray-loading mechanism, where the disc is loaded onto a motorized or manually operated tray, or a slot-loading mechanism, where the disc is slid into a slot and drawn in by motorized rollers or levers. A slot-loading mechanism with motorized rollers is depicted as an example. Moreover, the concepts are applicable to ODDs in which loading is performed by a user as well as ODDs in which loading occurs purely automatically without a user touching the disc such as in a so-called jukebox.

The loading path can extend in a direction (e.g., x direction) which perpendicular to an axis of the turntable (e.g., z direction).

A user inserts a disc in a loading path 402 represented by dashed lines. The loading path can be on one plane in the z direction. Sensor 419 detects the presence of the disc in the loading path. An optical pickup unit 409 can move radially and has a lens which can move vertically, e.g., toward and away from the disc, in one approach. The optical pickup unit 409 could also move toward and away from the disc. Rollers 408 are operated by a motor 407 to pull in the disc along the loading path. When the disc is fully inserted in the loading path, it drops into a region in which it is seated on a raised region 410 of a turntable 411 which is driven by a motor 417 via a shaft 420. In this case, the plane in which the disc is seated is lower than the loading plane.

Figure 5:
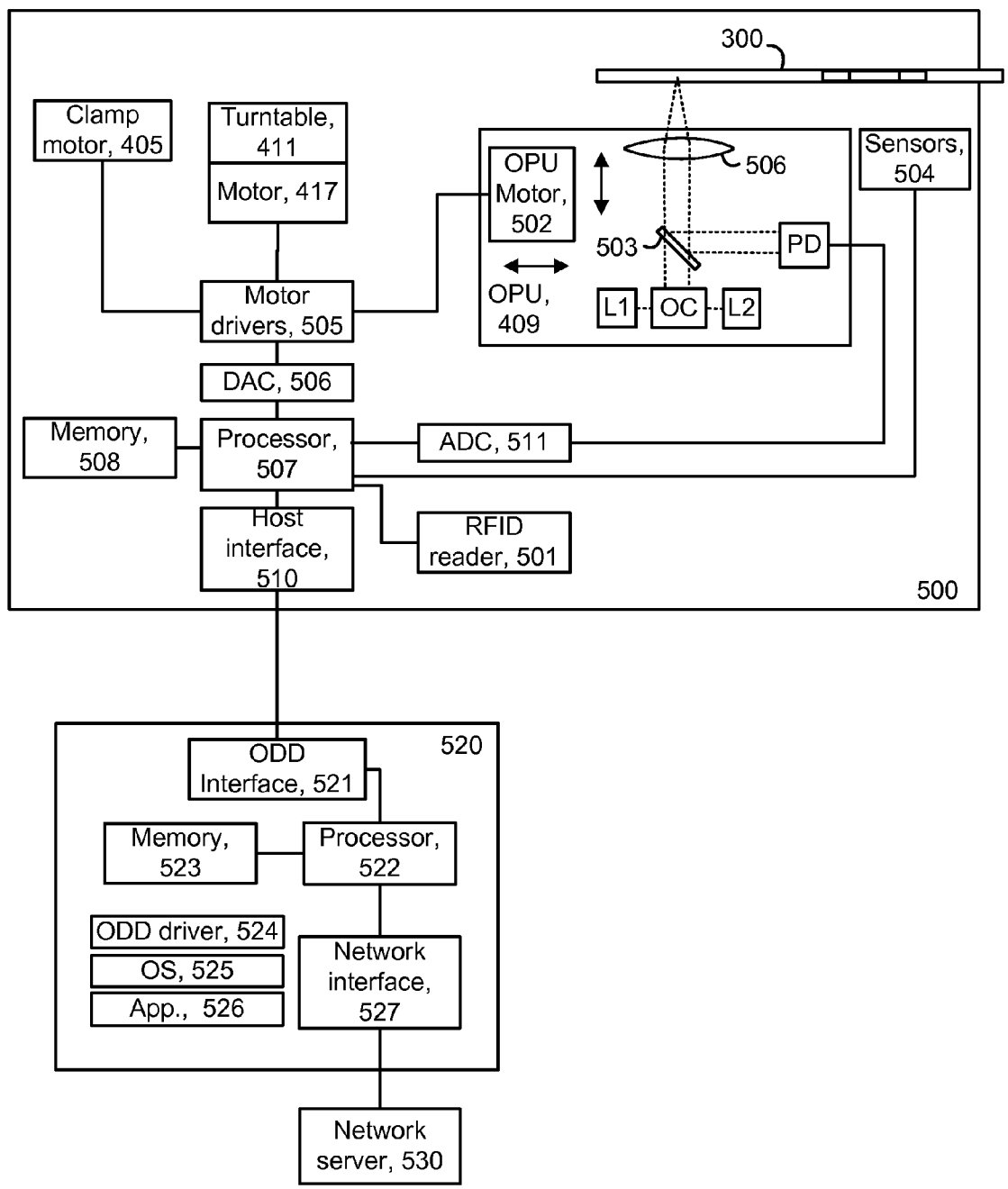
FIG. 5 depicts an example circuit consistent with the optical disc drive 400 of FIG. 4B to 4G.

The rotating components, e.g., the shaft and turntable, may be considered to be a spindle, and have a common axis of rotation 445. The shaft is depicted as extending above the motor in this example. Alternatively, the shaft may extend essentially entirely within the motor. Further, a cover 447 (e.g., a sleeve or wrap) extends around the shaft and/or motor, and coils 413 of a coil antenna 444 are wound around the cover. A magnetic insulating material 418 is provided between the cover and the coil antenna. The material can be a ferrite absorber such as a ferrite polymer composite film or sheet which is used to magnetically isolate the coil antenna from the metallic surroundings of the ODD. The material can be selected based on the RF which is used. For instance, an example RFID system operates at 13.56 MHz. The ferrite material prevents the creation of opposite currents that create degradation of the magnetic field due to the proximity of metal (e.g., the motor). An RFID reader 443 is provided by a circuit 416 and the coil antenna 444. The reader circuit 416 can be connected to a processor such as depicted in FIG. 5. The coil can be secured in place by adhesive or an outer layer which is made of a material which does not block RF signals.

In a seating (chucking) process, a clamping ring 406 operated by a motor 405 is positioned directly on top of the disc to hold it in place when the disc is rotated (see FIG. 4E). The clamp may be magnetically attracted to the spindle. This is one example approach of a loading process, as there are many other possible implementations.

FIG. 4C depicts a cross-sectional view of a portion of the motor/shaft of FIG. 4B along the dashed line 412. Depicted, extending radially outwardly from the axis of rotation, are the shaft 420, the cover 447, the magnetic insulating material 418 and the coils 413.

FIG. 4D depicts a representation of a cross sectional view of the disc drive 400 of FIG. 4A along the dashed line 403, where the disc 300 is at the end of the loading path in a position which is sensed by a sensor 404. At this time, the disc is aligned with the turntable and can be seated on it.

FIG. 4E depicts a representation of a cross sectional view of the disc drive 400 of FIG. 4A along the dashed line 403, where the disc 300 is clamped to a turntable 411. The clamping ring 406 is released from a held position using the motor 405 and forced against the disc by a magnetic force, in one approach. The clamping ring 406 rotates with the disc, holding it in place. The optical pickup unit 409 can move radially inward at this time to prepare to sense the disc.

FIG. 4F depicts a representation of a cross sectional view of the disc drive 400 of FIG. 4A along the dashed line 403, where a coil antenna 446 of an RFID reader 441 is secured to a top wall 440 of the housing of the ODD via a magnetic insulation material 430. The coil antenna includes example coils 431 and 432 which are connected to a reader circuit 416 (e.g., an integrated circuit or chip). In this approach, the RFID reader is spaced apart from the turntable. In one approach, the coil antenna is on the underside of the housing such as on a circular removable cover or lid of the housing. The RFID reader circuit 416 can be provided within the housing or outside the housing by appropriate routing of conductive paths or wires between the coil antenna and the circuit. The reader circuit 416 can be connected to a processor such as depicted in FIG. 5.

FIG. 4G depicts a frontal view of the RFID reader 441 of FIG. 4F. The reader circuit includes the circuit 416, the coil antenna 446 including coils 431 and 432 and the magnetic insulation material 430, e.g., ferrite polymer composite film.

FIG. 5 depicts an example circuit consistent with the optical disc drive 400 of FIG. 4B to 4G. An ODD 500 and a host computing device 520 can communicate via a host interface 510 at the ODD and an ODD interface 521 at the host. The ODD includes a clamp motor 405, turntable motor 417, turntable 411 and optical pickup unit (OPU) 409. The OPU includes a motor 502 which can move the OPU radially with respect to the disc as well as moving a lens 506 closer to or further away from the disc. Motor drivers 505 drive these motors in response to signals from a digital-to-analog converter (DAC) 511, which in turn is responsive to a processor 507. The processor may execute code stored in a memory 508. An RFID reader 501 communicates with the processor.

In one possible implementation, the OPU 409 includes lasers (light sources) L1 and L2 for use with different types of optical discs, e.g., CDs, DVDs and/or BDs. An optical coupler (OC) routes light from one of the lasers to the lens via a mirror 503. The light has a focal point on the disc 300, for instance. Reflected light from the disc is sensed by a photo detector (PD) (light detector). An analog-to-digital converter (ADC) 509 converts analog signals from the PD and provides them to a processor 507.

The sensors block 504 can represent sensors 404 and 419, as discussed. The sensors can be of any type. Examples include optical and mechanical limit switches. For example, an optical limit switch in a photo interrupter may emit an infrared beam which reflects from the disc and is detected by a photo detector receiver. The switch is tripped if the beam is interrupted, indicating that the disc has been inserted to the location of the switch.

In the host computing device 520, the processor 522 executes code from the memory 523 to provide the desired functionality. For example, the code may provide an ODD driver 524, an operating system (OS) 525 and an example application (App.) 526. A network interface 527 allows the host computing device to communicate with an online resource such as a network server 530.

Figure 6A:
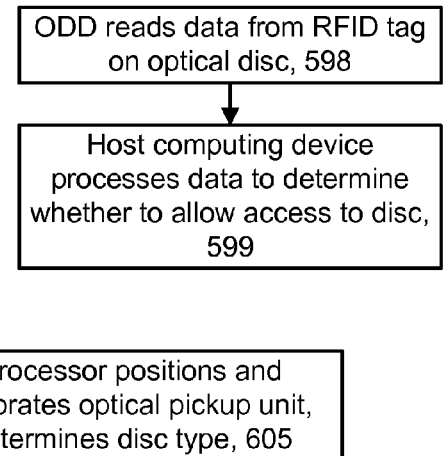
FIG. 6A depicts a process for controlling access to an optical disc.

FIG. 6A depicts a process for controlling access to an optical disc. At step 598, the ODD reads data from an RFID tag on an optical disc. See, e.g., FIG. 6B for further details. At step 599, a host computing device processes the data to determine whether to allow access to the disc. See, e.g., FIG. 7 for further details.

Figure 6B:
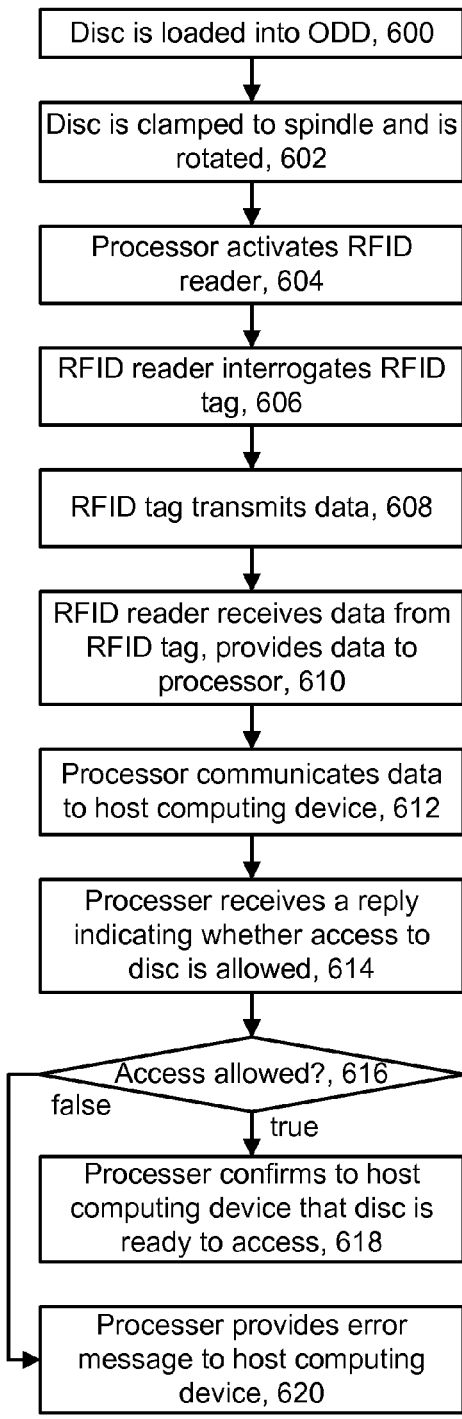
FIG. 6B depicts an example process of an ODD in obtaining data from an optical disc.

FIG. 6B depicts an example process of an ODD in obtaining data from an optical disc. At step 600, the disc is loaded into the ODD. At step 602, the disc is clamped to the spindle and is rotated. Alternatively, the tag can be read while the disc is not moving. At step 604, the processor activates the RFID reader. At step 605, the processor can position and calibrate the optical pickup unit and determine the disc type, for instance, in parallel with the other operations involving the RFID reader. In one approach, the laser is used to determine the disc type by measuring a thickness of the protective layer. These preparations can be made to ensure that the disc is ready to be read when a confirmation of access is received.

At step 606, the RFID reader interrogates the RFID tag. At step 608, the RFID tag transmits data to the RFID reader as a reply to the interrogation. For example, the data can include an authentication code. At step 610, the RFID reader receives the data from RFID tag, and provides the data to a processor. In different implementations, the decision of whether access to the disc is allowed can be made by different processing resources. In one approach, the RFID reader makes the decisions. In another approach, the processor in the ODD makes the decision. In another approach, the processor in a host computing device makes the decision. In another approach, an online resource makes the decision. Combinations of the above are possible as well. For example, the processor in the ODD can determine if access is not allowed while the processor in the host determines if access is allowed.

At step 612, the processor communicates the data to the host computing device. At step 614, the processor receives a reply from the host computing device indicating whether access to the disc is allowed. See FIG. 7 for an example process involving the host computing device. At decision step 616, if access is allowed, the processor confirms to host computing device that the disc is ready to access at step 618. If access is not allowed at decision step 616, the processor may provide an error message to the host computing device at step 620.

The data stored by the RFID tag can relate to another function besides authentication. For instance, the data can identify the content on the disc such as to maintain a library or historical record of content which has been accessed over time by a user. Moreover, the data can serve as proof that the user has played the optical disc. For instance, the data of the RFID may not be accessed or provided to a host device until the disc has been played. This approach may be used, e.g., to prove that a student has listened to a lecture on a disc.

Figure 7:
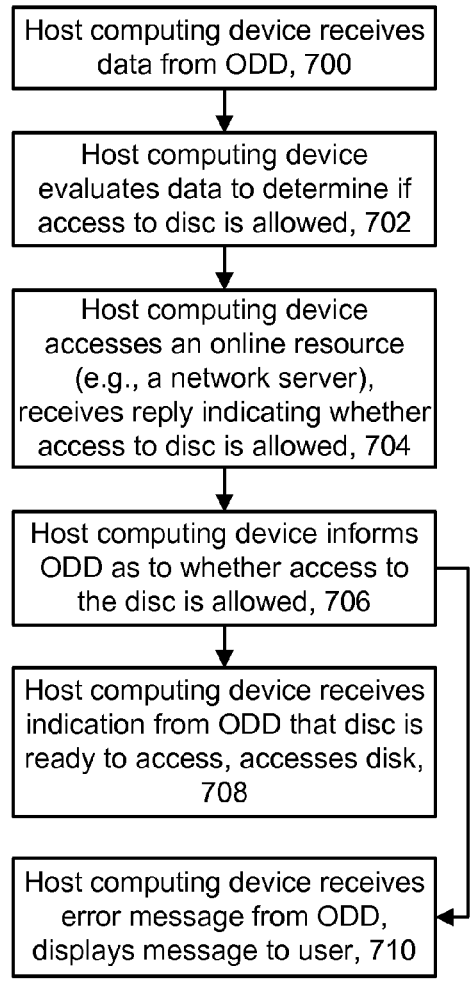
FIG. 7 depicts an example process of a host computing device in determining whether an ODD can access an optical disc.

FIG. 7 depicts an example process of a host computing device in determining whether an ODD can access an optical disc. At step 700, the host computing device receives data from the ODD. At step 702, the host computing device evaluates the data to determine if access to the disc is allowed. For example, the host computing device or an online resource can determine whether the data satisfies an authentication protocol and allow access to the optical disc if the data satisfies the authentication protocol. The authentication protocol can be any process which receives the data read from the RFID tag, or a value derived from the data, as an input, and, in response, decides whether to allow access to the optical disc. For example, the data can be a code word or a key to a cryptographic process.

For example, at step 704, the host computing device accesses an online resource (e.g., a network server) and receives a reply indicating whether access to the disc is allowed. At step 706, the host computing device informs the DD as to whether access to the disc is allowed. If access is allowed, at step 708, the host computing device receives an indication from the ODD that disc is ready to access, and accesses the disc. If access is not allowed, the host computing device receives an error message from the ODD, and displays a corresponding message to a user, at step 710.

A number of variations can be implemented. For example, it is possible to have more than one reader. One reader could have its antenna on the housing, e.g., above the disc, while another has its antenna around the motor shaft, e.g., below the disk. Both could read the tag and their results could be compared to ensure they agree. If they do not agree, an additional read could be performed. One reader could be used at first, and if it does not receive a valid result, the other reader could be used. The different readers could have different coil sizes, e.g., diameter and number of turns, and/or use different transmit powers. In another approach, the optical disc has multiple tags which are read by one or more readers. The tags could be on the same side or opposite sides of the disc. A reader below the disc could read the tag on the bottom of the disc, while a reader above the disc reads the tag on the top of the disc. Each tag could provide a different authentication code, where each code is used to determine whether to allow access to the disc. Or, one code could allow access to one part of the disc while another code allows access to another part of the disc. Generally, there could be multiple codes and multiple levels of security and authentication. Many other variations are possible.

Figure 8A:
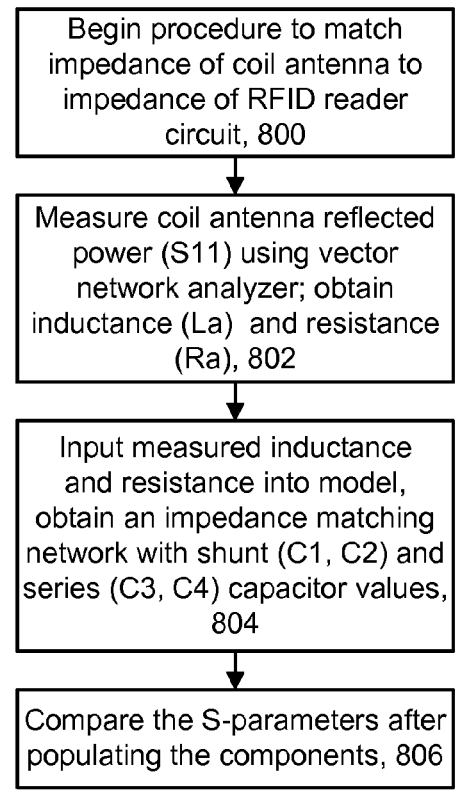
FIG. 8A depicts an example process for matching the impedance of an RFID reader circuit to the impedance of a coil antenna.

FIG. 8A depicts an example process for matching the impedance of an RFID reader circuit to the impedance of a coil antenna. When the RFID reader circuit interrogates the RFID tag, the RFID reader circuit provides power to the associated coil antenna. By matching the impedances, the amount of reflected power can be minimized, the power transfer maximized and power consumption can be reduced. Step 800 begins a procedure to match the impedance of the coil antenna to an impedance of the RFID reader circuit. Step 802 measures the coil antenna reflected power (S11) using a vector network analysis tool to obtain inductance (La) and resistance (Ra). S-parameters describe the input-output relationship between ports (or terminals) in an electrical system, so that S11 represents the power reflected at a first port such as port 810 in FIG. 8B. When measuring S11, it is desirable for the RF cables to be shielded using ferrite materials. Moreover, it is desirable to minimize use of coil antenna extension cables which may perturb the S11 measurements and to remove their effects from the measurement by applying proper de-embedding techniques. The coil inductance and series resistance are extracted from the measured Z-parameters. Ca is negligible at RFID frequencies and can be assumed to be 0.1 pF, for instance.

Step 804 inputs the measured inductance (La) and resistance (Ra) into model, and obtains an impedance matching network with shunt (C1, C2) and series (C3, C4) capacitor values. An example model is the Genesys® RF and Microwave Design Software available from Agilent Technologies, Inc., Santa Clara, Calif., although any other high frequency circuit simulator can be used for the same purpose. The shunt and series capacitances are the matching network degrees of freedom. The goal is to obtain a real input impedance which gives an optimal tradeoff between strength of magnetic field and current consumption. In experiments, an input impedance of about 30 ohms was suitable. The Genesys tool is used to synthesize an impedance matching network. This step includes running an optimizer and observing the impedance matching. Once the optimizer is finished, the capacitor values can be rounded to practical capacitor values. Step 806 compares the S-parameters after populating the components. Measurements of the S-parameters are compared to the simulations to ensure they are consistent.

A similar process could also be performed for matching the impedance of an RFID tag circuit to the impedance of its coil antenna.

Figure 8B:
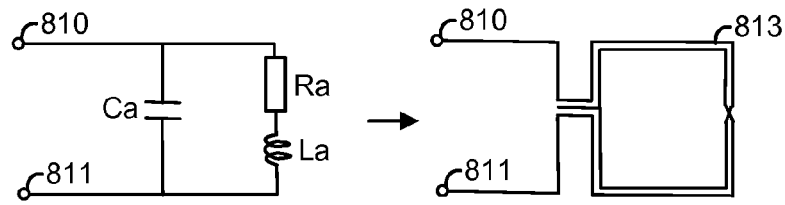
FIG. 8B depicts circuits corresponding to step 802 of FIG. 8A.

FIG. 8B depicts circuits corresponding to step 802 of FIG. 8A. For the coil antenna, Ra is the resistance, La is the inductance and Ca is the capacitance. Ports 810 and 811 are the two end points of the antenna. The circuit on the left is a representation of the antenna 813 on the right.

Figure 8C:
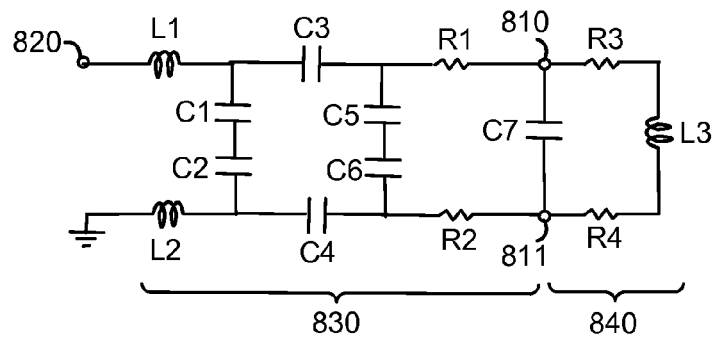
FIG. 8C depicts a circuit corresponding to step 804 of FIG. 8A.

FIG. 8C depicts a circuit corresponding to step 804 of FIG. 8A. The circuit of FIG. 8B includes a portion 840 which corresponds to the coil antenna circuit of FIG. 8C and a remaining portion 830 which represents the reader circuit. The reader circuit has a port 820 and another port at ground. As mentioned, C1 and C2 are the shunt capacitances and C3 and C4 are the series capacitances which can be optimized by the process of FIG. 8A. L1 and L2 are inductances and R1 and R2 are resistances.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. An optical disc drive, comprising:
a turntable;
a shaft which connects the turntable to a motor;
a cover around the shaft;
a coil antenna around the cover, the coil antenna comprises a coil which is wound around the cover in multiple turns along a length of the cover, and the coil antenna has rotational symmetry about an axis of the shaft;
an RFID reader circuit connected to the coil antenna; and
a processor in communication with the RFID reader circuit, the processor receives data from the RFID reader circuit.

2. The optical disc drive of claim 1, further comprising:
a magnetic insulating material between the coil antenna and the cover.

3. The optical disc drive of claim 2, wherein:
the magnetic insulating material comprises a ferrite polymer composite film.

4. The optical disc drive of claim 1, wherein:
the processor communicates the data to a host computing device to determine whether the data satisfies an authentication protocol and allows access to an optical disc if the host computing device indicates that the data satisfies the authentication protocol.

5. The optical disc drive of claim 1, wherein:
the processor activates the RFID reader circuit to read the data when an optical disc is seated on the turntable and the shaft is rotating.

6. The optical disc drive of claim 1, wherein:
the coil antenna has an impedance which is matched to an impedance of the RFID reader circuit using a shunt capacitor and a series capacitor.

7. The optical disc drive of claim 1, further comprising:
a clamp above the turntable, wherein the shaft, the cover and the coil antenna are below the turntable.

8. An optical disc drive, comprising:
a housing;
a turntable within the housing;
a shaft which connects the turntable to a motor;
a cover around the shaft;
a coil antenna within the housing, the coil antenna has rotational symmetry about an axis of the shaft and is spaced apart from the turntable, and the coil antenna comprises a coil which is wound around the cover along a length of the cover;
a magnetic insulating material between the coil antenna and the housing;
an RFID reader circuit connected to the coil; and
a processor in communication with the RFID reader circuit, the processor receives data from the RFID reader circuit.

9. The optical disc drive of claim 8, wherein:
the magnetic insulating material comprises a ferrite polymer composite film.

10. The optical disc drive of claim 9, wherein:
the ferrite polymer composite film is secured to a wall of the housing and the coil antenna is secured to the ferrite polymer composite film.

11. The optical disc drive of claim 8, wherein:
the processor activates the RFID reader circuit to read the data when an optical disc is seated on the turntable and the turntable is rotating.

12. The optical disc drive of claim 8, wherein:
the RFID reader circuit comprises a shunt capacitor and a series capacitor which match an impedance of the RFID reader circuit to an impedance of the coil antenna.

13. A method for authenticating an optical disc, comprising:
rotating a turntable on which an optical disc is seated, wherein a shaft connects the turntable to a motor and a cover is around the shaft;
while the turntable is rotating, activating an RFID reader circuit which is connected to a coil antenna having a rotational symmetry with an axis of the turntable, the coil antenna comprising a coil which is wound around the cover along a length of the cover;
at the RFID reader circuit, reading an authentication code from an RFID tag carried by the optical disc; and
determining whether to allow access to the optical disc based on the authentication code.

14. The method of claim 13, wherein:
the determining whether to allow access comprises communicating the authentication code to a host computing device, and receiving a reply from the host computing device indicating whether to allow access to the optical disc.

15. The method of claim 14, wherein:
the host computing device access an online resource using the authentication code and receives a reply indicating whether to allow access to the optical disc.

16. The method of claim 13, wherein:
the RFID tag is carried in a hub of the optical disc, the hub extends around a central aperture in the optical disc; and
the RFID tag comprises a circuit and a coil antenna, the coil antenna of the RFID tag extends around the central aperture in multiple turns and has a rotational symmetry with the axis of the turntable when the optical disc is seated on the turntable.

17. The method of claim 16, wherein:
the coil antenna of the RFID tag is printed on a substrate which is attached to a surface of the optical disc.

18. The method of claim 16, wherein:
the coil antenna of the RFID tag comprises conductive ink.

19. The method of claim 16, wherein:
the coil antenna of the RFID tag is embedded in the optical disc.

20. The method of claim 16, wherein:
the coil antenna of the RFID tag is provided in a flexible printed circuit board which is attached to a surface of the optical disc.

* * * * *